United States Patent [19]

Fernandez et al.

[11] Patent Number: 4,852,749
[45] Date of Patent: Aug. 1, 1989

[54] EXPANDABLE CHAFFING DISH STRUCTURE

[76] Inventors: Elio M. Fernandez, 114 Airport Rd.; Jean DeVane, Rte. 1, Box 54, both of Sylvester, Ga. 31791

[21] Appl. No.: 163,305

[22] Filed: Mar. 2, 1988

[51] Int. Cl.⁴ ............................................. A47J 47/00
[52] U.S. Cl. ..................................... 211/133; 211/194
[58] Field of Search ............... 211/133, 126, 184, 194, 211/189; 126/43, 33; 270/23.4; 312/108; D7/335

[56] References Cited

U.S. PATENT DOCUMENTS

| | | | |
|---|---|---|---|
| 687,740 | 12/1901 | French | 312/108 |
| 1,937,132 | 11/1933 | Seaman | 211/184 |
| 3,207,098 | 9/1965 | Alpert | 211/194 X |
| 4,231,626 | 11/1980 | Amtmann et al. | 312/108 X |
| 4,429,796 | 2/1984 | Sussman | 211/189 X |
| 4,463,684 | 8/1984 | Klungle et al. | 211/126 X |
| 4,502,741 | 3/1985 | DeVries | 211/126 X |

FOREIGN PATENT DOCUMENTS 2164241  3/1986  United Kingdom ................ 312/108

Primary Examiner—Alvin C. Chin-Shue
Attorney, Agent, or Firm—Leon Gilden

[57] ABSTRACT

A chaffing dish organization is set forth wherein a basic "U" shaped chaffing dish support has formed therein associating slots to receive registering hooks of an "L" shaped expansion portion enabling expansion of the chaffing dish structure to accommodate any desired size of chaffing dish for heating and cooking thereof. A variety of heating and support members are slidably receivable within a variety of height adjustment slots within the walls of the chaffing dish support. Furthermore, when not in use, the chaffing dish and associated elements are stackable by the registering of feet positioned underlying the chaffing dish support structure into accommodating openings within upper surfaces of associatable chaffing dish support structure.

6 Claims, 2 Drawing Sheets

U.S. Patent   Aug. 1, 1989   Sheet 1 of 2   4,852,749
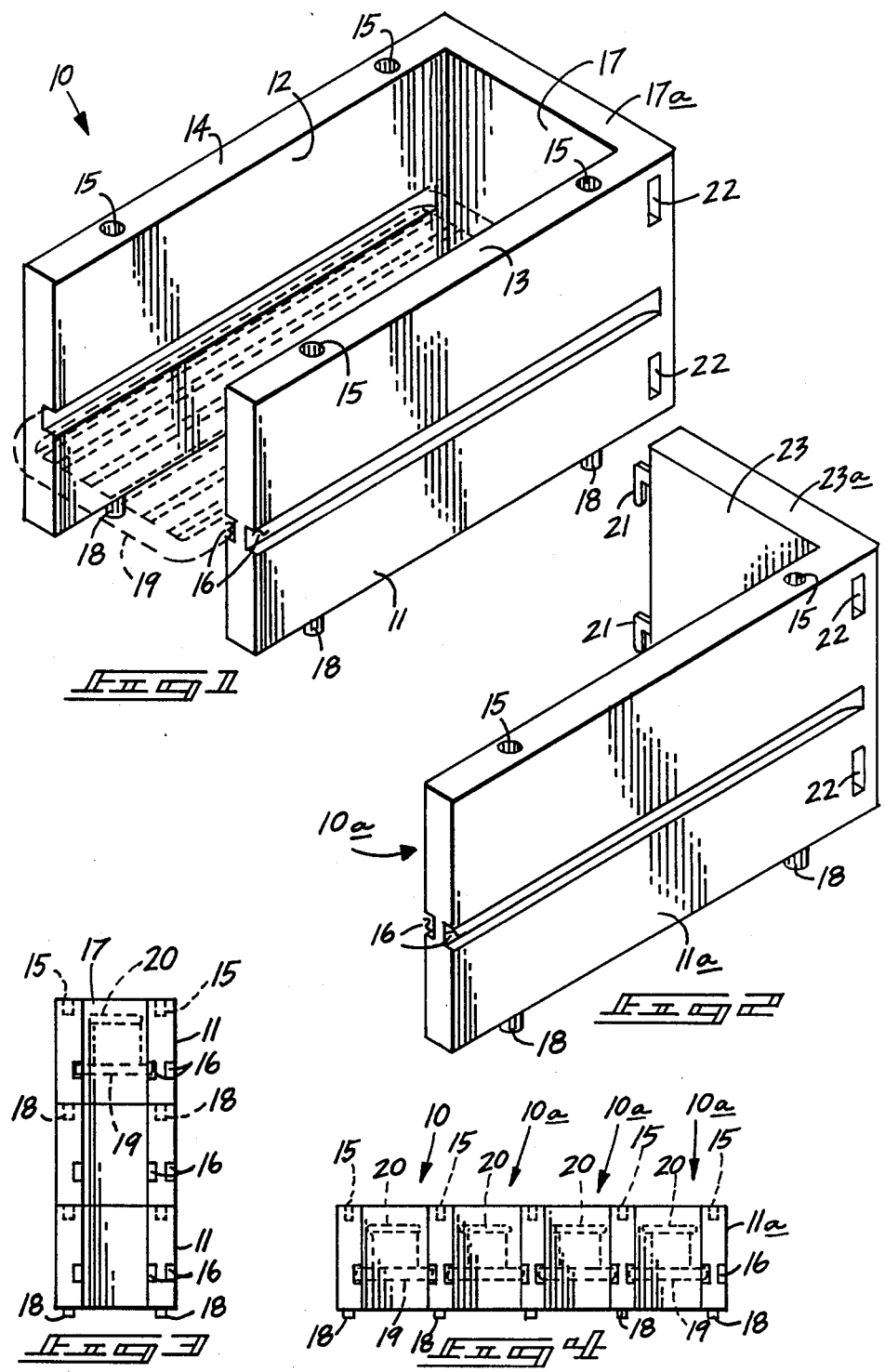

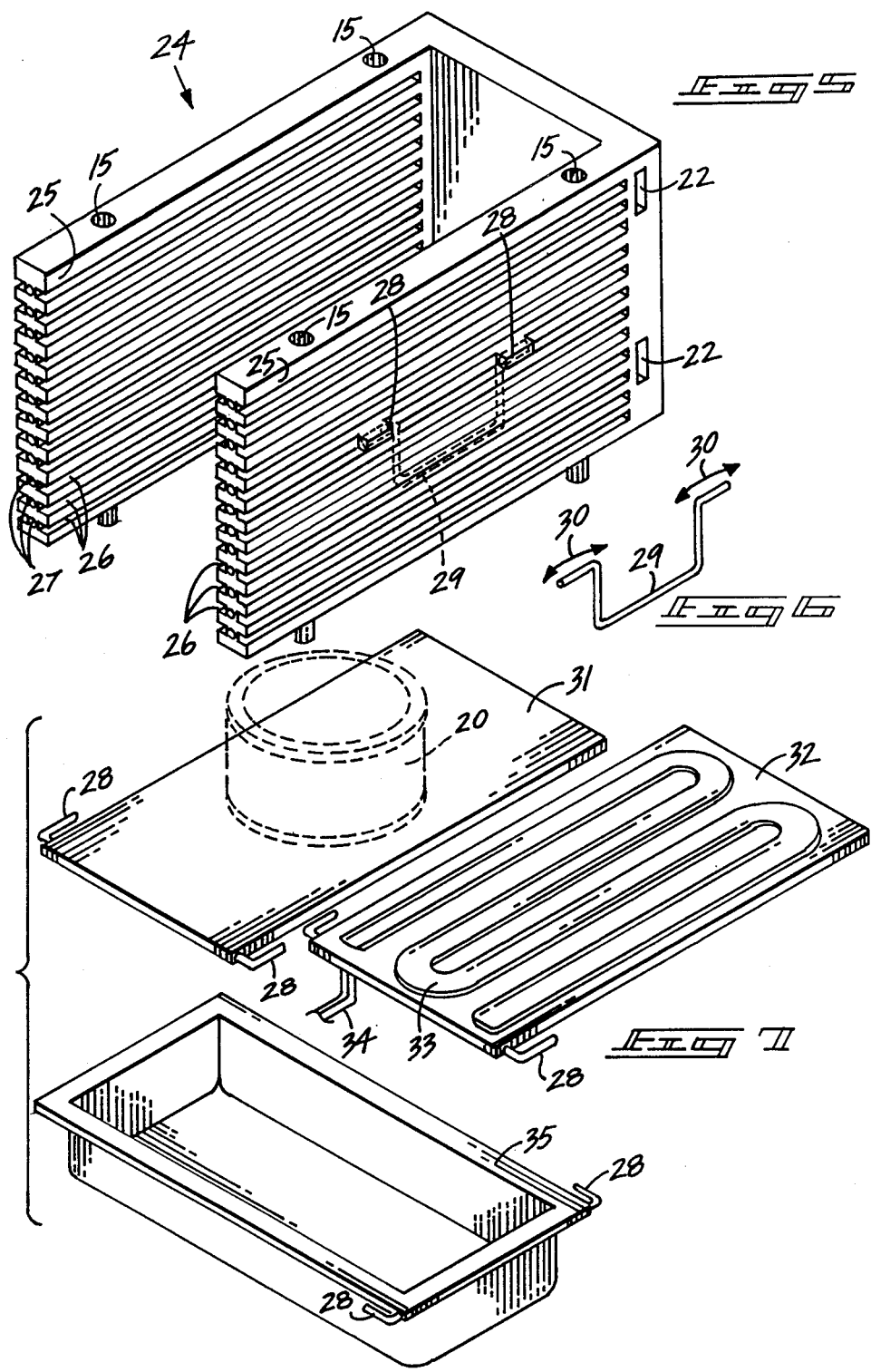

EXPANDABLE CHAFFING DISH STRUCTURE

BACKGROUND OF THE INVENTION

1. Field of the Invention

The present invention relates to chaffing dishes, and more particularly pertains to a new and improved chaffing dish support structure that, when not being utilized, may be stacked to a compact size for storage thereof and in use is expandable for accommodation of a variety of chaffing dish sizes.

2. Description of the Prior Art

The use of chaffing dishes and associated stands including heating elements is well known in the prior art. As may be appreciated, these devices have normally been of expansive structure and size and as such when not utilized have been ill-configured for storage of same. Furthermore, chaffing dish structures and particularly stands therefore, have been of preselected size and configuration to accommodate unique and individual chaffing dishes for heating and warming purposes. In this connection, there are several examples of prior art chaffing dishes and stands wherein U.S. Pat. No. Des. 38,466 to Gutermann, Des. 146,832 to O'Connell, and Des. 168,905 to O'Connell, and Des. 213,899 to Rickmeier, and Des. 215,410 to Purciani, and Des. 262,595 to Martenson are all examples of prior art chaffing dishes including the limitations of the prior art.

The problems associated furthermore with prior art chaffing dishes and stands therefore have been that the preselected unitary size of prior art chaffing dishes have not enabled their accommodation of over-size chaffing dishes wherein in an attempt to balance an over-size dish on a prior art stand, tippage and accidental spillage flowing therefrom has always presented an ever present danger particularly when the common practice in chaffing dish usage is in social gatherings where inadvertent maneuvering of individuals would present the problem tipping over a chaffing dish of prior art organization. Also, when over-sized chaffing dishes are positioned on an undersized stand, as occurs in the prior art, accessory heating units positioned under the expanded chaffing dish surface to provide adequate heat are positionable in an exposed and unprotected orientation relative to the chaffing dish creating potential fire problems.

As such, it may be appreciated that there is a continuing need for a new and improved chaffing dish structure and particularly a chaffing dish support stand which addresses both the problem of versatility storage and expandability in accommodating various sizes of chaffing dishes and in this respect, the present invention substantially fulfills this need.

SUMMARY OF THE INVENTION

In view of the foregoing disadvantages inherent in the known types of chaffing dish structures now present in the prior art, the present invention provides a chaffing dish structure which may be compactly stored when not used and may be further easily and efficiently expanded for accommodation of a variety of chaffing dish sizes. As such, the general purpose of the present invention, which will be described subsequently in greater detail, is to provide a new and improved chaffing dish structure which has all the advantages of the prior art chaffing dish stands and none of the disadvantages.

To attain this, the present invention comprises a chaffing dish support stand which may be compactly stored by stacking successive chaffing dish stands upon one another for subsequent usage. A plurality of slots provided within the vertical wall surface of the chaffing dish accommodate a variety of slide-in trays for supporting of or including heating elements. Expandability of the chaffing dish is effected by the provision of associating slots formed within vertical walls of discrete chaffing dish units for accommodating registering hooks therein of expansion units for secure positioning of said expansion chaffing dish support units.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved chaffing dish structure which has all the advantages of the prior art chaffing dish structures and none of the disadvantages.

It is another object of the present invention to provide a new and improved chaffing dish structure which may be easily and efficiently manufactured and marketed.

It is a further object of the present invention to provide a new and improved chaffing dish structure which is of a durable and reliable construction.

An even further object of the present invention is to provide a new and improved chaffing dish structure which is susceptible of a low cost of manufacture with regard to both materials and labor, and which accordingly is then susceptible of low prices of sale to the consuming public, thereby making such chaffing dish structures economically available to the buying public.

Still yet another object of the present invention is to provide a new and improved chaffing dish structure which provides in the apparatuses and methods of the prior art some of the advantages thereof, while simultaneously overcoming some of the disadvantages normally associated therewith.

Still another object of the present invention is to provide a new and improved chaffing dish structure which includes a chaffing dish stand stackable in a vertical relationship with other such stands for storage thereof.

Yet another object of the present invention is to provide a new and improved chaffing dish structure wherein a basic chaffing dish stand of "U" shaped configuration has provisions for inter-engagement and locking of expansion "L" shaped chaffing dish stand structure for expansion of the chaffing dish stand in accommodating a variety of chaffing dish dishes of varying sizes.

These together with other objects of the invention, along with the various features of novelty which characterize the invention, are pointed out with particularity in the claims annexed to and forming a part of ths disclosure. For a better understanding of the invention, its operating advantages and the specific objects attained by its uses, reference should be had to the accompanying drawings and descriptive matter in wihch there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the present invention illustrating the chaffing dish stand.

FIG. 2 is an isometric illustration of the present invention illustrating an accessory chaffing dish stand for expansion of the basic stand.

FIG. 3 is an orthographic view in elevation of a plurality of chaffing dish stands stacked upon one another for storage thereof.

FIG. 4 is an orthographic view taken in elevation of the chaffing dish stand expanded with a plurality of "L" shaped members.

FIG. 5 is an isometric illustration of a modified chaffing dish stand defined by the instant invention.

FIG. 6 is an isometric illustration of a carrying handle utilized by the instant invention.

FIG. 7 is an isometric illustration of a variety of tray members for use with the chaffing dish stand of the instant invention.

DESCRIPTION OF THE PREFERRED EMBODIMENT

With reference now to the drawings, and in particular to FIG. 1 thereof, a new and improved chaffing dish structure embodying the principles and concepts of the present invention and generally designated by the reference numeral 10 will be described.

More specifically, it will be noted that the expandable chaffing dish structure 10 includes a generally "U" shaped member formed with a right side wall 11 and a left side wall 12 and an end wall 17. Formed on right side wall's top surface 13 and left side wall's top surface 14 are pairs of blind bore openings 15. The openings 15 are oriented and configured for reception of the foot elements 18 positioned on lowermost surfaces of the respective side walls.

FIG. 3 is illustrative of the registration of feet 18 within the blind bore openings 15 enabling a stacking of a plurality of the chaffing dish support structure 10 to whatever height is desirable.

Formed within vertical surfaces of the respective side walls are tray receiving slots 16 configured for sliding reception of a slide-in tray element 19. The slide-in tray element 19 accommodates a positioning and withdrawal of a heat source 20 utilized in the heating of a chaffing dish to utilize with the structure 10. Should lesser heat be desired by a user of the instant invention for the heating of a chaffing dish, tray 19 may be merely removed and the heat source positioned within the confines of the "U" shaped portion of structure 10 thereby at a more spaced position relative to a dish to be supported on top surfaces 13, 14, and top surface 17a of end wall 17.

Expansion of the structure of designated as 10 is permited by the use of "L" shaped expansion member elements 10a. FIG. 4 is illustrative of a series of "L" shaped members 10a affixed to a basic structure 10. Formed with a side wall 11a of identical dimensions of side wall 11 and a rear wall 23 including a top surface 23a of identical dimensions to rear wall 17 and top surface 17a respectively. Member 10a is secured to structure 10 by means of registering hooks 21 positionable within associating slots 22 formed within a rearwardmost portion of right side wall 11 of structure 10. Formed with foot elements 18 and blind bore openings 15, the "L" shaped member 10a is stackable in a similar manner to structure 10, as illustrated in FIG. 3.

It may be appreciated therefore that the relatively unlimited expansion of the organization utilizing structure 10 and members 10a enables a dimensional configuration of a chaffing dish structure to support any desired chaffing dish as may become necessary.

The modification of the instant invention, as illustrated in FIG. 5, contemplates a multi-adjustable "U" shaped chaffing dish, as set forth in FIG. 1 wherein a plurality of side walls 25 have formed therein a plurality of slots formed internally and externally of the wall 25 providing multi-height adjustment of an associated tray to be positioned therein. The slots 26 are cooperative with the aforenoted trays where additionally friction bores 27 cooperate with friction pegs 28 of a slight interference fit to frictionally secure the associated trays within the chaffing dish structure, as set forth in FIG. 5, minimizing accidental removal or withdrawal of the associated trays.

As in the embodiment of FIG. 1, the chaffing dish stand 24 includes a plurality of bore openings 15 and associating slots 22 for registration of expanding "L" shaped members of parallel configuration to that as set forth in FIG. 2 with the addition of the multi-slots 26 and bores 27.

Additionally, the chaffing dish stand 24 has formed thereto a plurality of bosses 28 for accepting a removable handle 29 that may be flexed along arrows 30 for insertion into openings within the bosses 28 for enabling enhanced transport of chaffing dish stand 24.

FIG. 7 illustrates a variety of trays that may be utilized in association with the chaffing dish stand 24, such as a support tray 31 for accepting a heat source 20 with the addition of the registering pegs 28. Heating tray 32 has formed therein a plurality of resistance heating elements 33 sinuously formed within surface of heating tray 32 and provided with a power cord 34 for supplying electrical power to the heating tray 32. Additionally, a reservoir tray 35 is utilized with additional pegs 28 for frictional engagement with bores 27 for the securement of various liquids and the like that may be heated or cooked by means of trays 31 or 32 to be utilized in combination with the reservoir tray 35.

As to the manner of usage and operation of the present invention, the same should be apparent from the above description. Accordingly, no further discussion relative the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An expandable chaffing dish structure for accommodating a range of chaffing dishes comprising, a "U" shaped member formed with a vertical right side wall, left side wall, and adjoining rear wall defining an upper support surface for support of a chaffing dish, and a first and second planar tray, and a first horizontal tray slot formed along an interior surface of said left side wall with a second horizontal tray slot formed along an interior surface of said right side wall, and a third tray slot formed along an exterior surface of said right side wall wherein said first and second slots are arranged for accommodating the first planar slide-in tray element with said first and second slots where said tray element provides a support surface for support of a heat source, and an expansion "L" shaped member securable to said "U" shaped member including a side wall and end wall for providing additional support surface for said chaffing dishes, and wherein said "U" shaped member and said "L" shaped member are formed with blind bores in their support surface and feet members at lower portions of the side walls wherein said blind bores receive said feet portions enabling stacking of said "U" shaped and "L" shaped members, as desired, and wherein associating slots are formed along rearwardmost portions of exterior surfaces of said side walls of said "U" shaped members for receiving registering hooks formed at rearwardmost positions of walls of said "L" shaped members, and wherein said "L" shaped members are formed with a fourth tray slot along an interior surface of the side wall, and a fifth tray slot formed along an exterior surface of the side wall for acceptance of said second slide-in tray associatable with said slots of said "L" shaped member and said third slot of said "U" shaped member, and said slots are in horizontal alignment when said "L" shaped member is secured to said "U" shaped member.

2. An expandable chaffing dish structure as set forth in claim 1 wherein said "L" shaped member is formed with a rear wall and side wall wherein said rear wall is of identical dimension as said adjoining rear wall of said "U" shaped member and said side wall of said "L" shaped member is the identical dimension of a side wall of said "U" shaped member.

3. An expandable chaffing dish structure as set forth in claim 1 wherein said horizontal tray slots include a plurality of slots formed within said side walls on both sides thereof and are formed along the entire height of the side walls.

4. An expandable chaffing dish structure as set forth in claim 3 wherein a like number of bores are formed within end surfaces of said side walls and are of a like number as said slots.

5. An expandable chaffing dish structure as set forth in claim 4 wherein one or more of a plurality of trays is positionable within said slots wherein said trays further includes pegs for frictional engagement with said bores and said pegs are formed at forward side edges of said trays and directed parallel to said trays.

6. An expandable chaffing dish structure as set forth in claim 5 wherein said trays comprise a support trays, an electrical resistance heating tray, and a reservoir tray wherein said reservoir tray is formed as a container.

* * * * *